United States Patent
Lampe et al.

(10) Patent No.: US 8,290,090 B2
(45) Date of Patent: Oct. 16, 2012

(54) BLIND AMPLITUDE ESTIMATION FOR RECEIVED SYMBOLS

(75) Inventors: Alexander Lampe, Leipzig (DE); Stefan Mueller-Weinfurtner, Nuremberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 804 days.

(21) Appl. No.: 12/346,515

(22) Filed: Dec. 30, 2008

(65) Prior Publication Data

US 2009/0181718 A1 Jul. 16, 2009

Related U.S. Application Data

(63) Continuation-in-part of application No. PCT/IB2007/052426, filed on Jun. 22, 2007.

(30) Foreign Application Priority Data

Jul. 3, 2006 (EP) .................................... 06116526

(51) Int. Cl.
  *H03K 9/06* (2006.01)
(52) U.S. Cl. ....................... 375/322; 375/340
(58) Field of Classification Search ............ 375/322, 375/324, 316, 349, 341, 262, 340; 370/310; 341/143
See application file for complete search history.

(56) References Cited

U.S. PATENT DOCUMENTS

| | | | | |
|---|---|---|---|---|
| 4,608,903 A * | 9/1986 | Deutsch | ......................... | 84/608 |
| 6,952,561 B1 * | 10/2005 | Kumar et al. | ................ | 455/63.1 |
| 7,035,659 B1 * | 4/2006 | Yang | .............................. | 455/522 |
| 7,359,311 B1 * | 4/2008 | Paranjpe et al. | .............. | 370/203 |
| 2001/0051870 A1 * | 12/2001 | Okazaki et al. | ............... | 704/207 |
| 2002/0097785 A1 * | 7/2002 | Ling et al. | ..................... | 375/147 |
| 2003/0115061 A1 * | 6/2003 | Chen | ............................ | 704/240 |
| 2004/0096015 A1 | 5/2004 | Ishii et al. | | |
| 2004/0179583 A1 * | 9/2004 | Jeong | ............................ | 375/147 |
| 2005/0025076 A1 * | 2/2005 | Chaudhuri et al. | ........... | 370/310 |
| 2006/0103587 A1 * | 5/2006 | Cedergren et al. | ............. | 345/1.2 |
| 2006/0114977 A1 * | 6/2006 | Ginis et al. | ..................... | 375/222 |
| 2006/0164270 A1 * | 7/2006 | Miller et al. | .................. | 341/143 |
| 2006/0291503 A1 * | 12/2006 | Chapman | ...................... | 370/469 |
| 2007/0047675 A1 * | 3/2007 | Pietraski | ....................... | 375/340 |
| 2007/0234178 A1 * | 10/2007 | Richardson et al. | .......... | 714/758 |
| 2009/0161792 A1 * | 6/2009 | Betts | ............................. | 375/295 |

* cited by examiner

*Primary Examiner* — Emmanuel Bayard (74) *Attorney, Agent, or Firm* — Potomac Patent Group PLLC (57) ABSTRACT

A receiver apparatus and method are provided blind amplitude estimation for a received complex signal, wherein the complex signal is analyzed to determine first and second order statistics of real part and imaginary part of the complex signal. Based on a predetermined non-linear function, amplitude scaling information is pre-calculated and used to derive a desired amplitude scaling information for said determined first and second order statistics. Thereby, a low complexity method for blind amplitude estimation for unknown data symbols distorted by an unknown amount of noise can be provided.

22 Claims, 3 Drawing Sheets

FIG. 5 ical field

BLIND AMPLITUDE ESTIMATION FOR RECEIVED SYMBOLS

TECHNICAL FIELD

The present disclosure generally relates to a receiver apparatus for receiving a complex signal via a digital transmission channel, and to a method of blind amplitude estimation for a received complex signal. In particular but not exclusively, the present disclosure relates to a communication system in which an M-ary modulation scheme is employed for digital transmission.

BACKGROUND INFORMATION

In a digital communication system, digital symbols representing information are transmitted between different devices, e.g., between a base station device and a mobile terminal, to exchange information.

At the receiver side, the received signal is processed to obtain a sequence or stream of digital samples and these samples may be represented as complex symbols. For example, the received signal may be filtered, amplified, and mixed down to base band using in-phase and quadrature local oscillators, and after analog-to-digital (A/D) conversion and synchronization processing, a stream of complex received symbols is obtained. Each symbol in the complex symbol stream may be represented as a sum of a real part and an imaginary part.

Newer 3rd generation (3G) cellular communication systems employ wideband code division multiple access (WCDMA) technology. An extension of the WCDMA standard is known as high speed downlink packet access (HS-DPA) and has recently been standardized within the $3^{rd}$ Generation Partnership Project (3GPP) standardization organization. HSDPA introduces known technologies such as higher order modulation and incremental redundancy to the 3GPP Universal Mobile Telecommunications System (UMTS) standard. The higher order modulation introduced in HSDPA is M-QAM, and more particularly 16-state Quadrature Amplitude Modulation (16-QAM).

Figure 2:
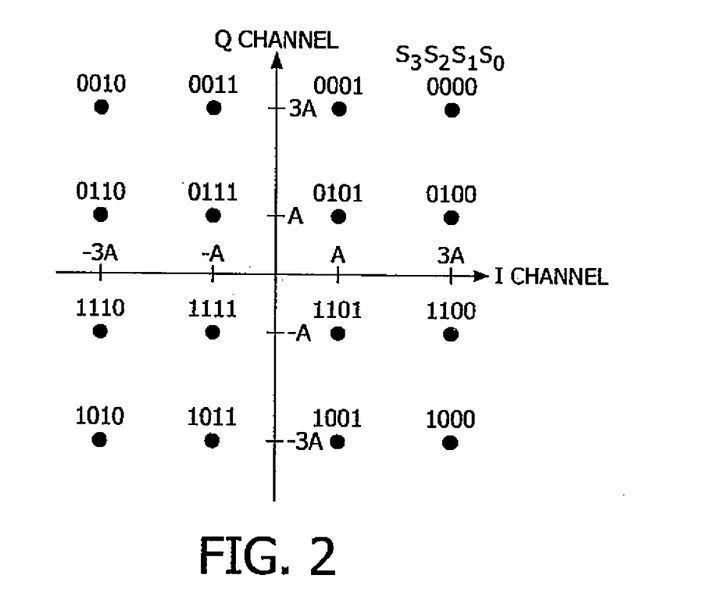
FIG. 2 shows a complex diagram indicating possible symbols of a 16-QAM modulation scheme.

FIG. 2 shows a schematic complex diagram, wherein the horizontal or x-axis corresponds to the in-phase (I) channel (i.e., real part of the complex symbol) and the vertical axis or y-axis corresponds to the quadrature (Q) channel (or imaginary part of the complex symbols). Generally speaking, 16-QAM is achieved by modulating two four-level pulse amplitude modulated (PAM) signals onto two respective orthogonal carriers (I and Q), providing $4^2=16$ possible symbol representations. Accordingly, a 16-QAM symbol includes phase information based on the respective I or Q orthogonal carrier and amplitude information, whereas Quadrature Phase Shift Keying (QPSK) detection, by comparison, includes only phase information.

In FIG. 2, every black area or dot represents one complex symbol with its phase and amplitude information. The amplitude information corresponds to the radial distance of the dot from the origin of the coordinate system and the phase information corresponds to the angle with respect to the positive x-axis. Due to the fact that 16 symbols can be represented in the 16-QAM system, each symbol corresponds to a 4-bit word comprising four bits $S_0$ to $S_3$. The binary representations of the complex symbols are indicated above the dots in FIG. 2.

Receivers in WCDMA systems rely on a reference signal, such as a time-multiplexed pilot symbol or code-multiplexed pilot channel, to calculate estimates of a radio channel's response. Typically, the channel gain and phase of the Common Pilot Channel (CPICH) is estimated once per slot for this purpose. The 16-QAM data, which is transferred on the High Speed Physical Downlink Shared Channel (HS-PDSCH), requires processing of phase and amplitude information to recover the information in the data. While the phase information can be reused from the CPICH based measurements, the gain offset between the CPICH and HS-PDSCH, which is unknown to the receiver, must be determined separately in order to establish an amplitude reference.

Thus, in order to correctly demodulate the transmitted symbols, the amplitude or, equivalently, scaling factor of the transmitted symbols has to be known. In many systems, the amplitude is not known a-priori on the receiver side and therefore has to be estimated. The accuracy of this estimate has direct impact on the link level performance in terms of frame error rate and/or data throughput.

If no information on the amplitude of the transmitted symbols (e.g., relative to known pilot symbols) is signaled, this amplitude has to be "blindly" estimated by the receiver. E.g., based only on the unknown received data symbols. In a real world transmission system, the received symbols are additionally distorted by noise and/or interference with unknown statistical parameters.

However, conventional methods for blind amplitude estimation require quite complex calculations.

The U.S. Patent Application Publication No. 2004/0096015 A1 discloses estimation of the average value of the in-phase/quadrature component of a received signal as well as signal power by averaging the magnitudes of a sufficiently large number of received signal samples. These values are used by a hard decision unit to estimate the amplitude of the data symbols. However, a specific method of calculation of these amplitude estimates is not given or cited.

BRIEF SUMMARY

One embodiment provides a low complexity scheme for blind amplitude estimation for unknown data symbols which are distorted by an unknown amount of noise.

Accordingly, an amplitude scaling information required for amplitude estimation is obtained in one embodiment by addressing a memory (e.g., look-up table) storing pre-calculated amplitude scaling information, based on first and second order statistics, which can be calculated. Thereby, the blind amplitude estimation is reduced to a calculation of simple first and second order statistics and a simple memory look-up operation. Complexity is thereby significantly reduced.

The first and second order statistics may relate to an expectation value of the magnitude and a variance of the complex signal. The expectation value and the variance can be readily calculated from real parts and imaginary parts of the received complex signal.

The first and second order statistics may be obtained by taking a predetermined number of received symbols of the complex signal into account.

Furthermore, the determination means may be adapted to address the memory means based on a ratio between the first and second order statistics. This ratio may be selected to define a direct non-linear functional relationship between the ratio and the amplitude scaling information, so that the amplitude scaling information stored in the memory means merely reflects this non-linear functional relationship.

The predetermined non-linear function may be derived from probability density functions of noise and symbols provided in the complex signal. These probability density functions can be determined for the provided modulation scheme and related complex symbols to thereby pre-calculate the non-linear relationship, based on which the amplitude scaling information is stored.

BRIEF DESCRIPTION OF THE SEVERAL VIEWS OF THE DRAWINGS

One or more embodiments will now be described with reference to the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following, one or more embodiments will be described in an initial general part and a later specific part for an example of a 16-QAM modulation based on a statistical signal model.

Figure 1:
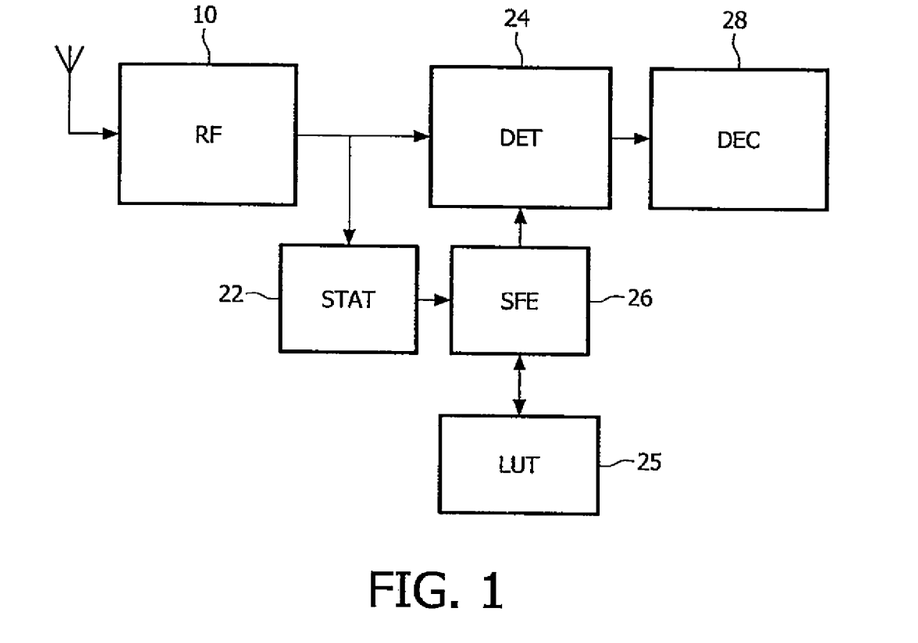
FIG. 1 shows a schematic block diagram of a receiver apparatus according to one embodiment.

FIG. 1 shows a schematic block diagram of a receiver apparatus, as provided for example in a mobile phone or user equipment. The receiver device receives a signal via an antenna. The received signal may be a data chip sequence, which is a high-speed data series spread over a wide band, and which may have been modulated in a transmission apparatus by a multi-level quadrature amplitude modulation, such as 16-QAM or 64-QAM. The received sequence of data chips is supplied to a radio frequency (RF) unit 10 which may comprise a demodulator for demodulating the received signal, a despreader, a RAKE combiner or the like, so as to obtain a sequence of complex symbols at baseband frequency level.

The baseband signal from the RF unit 10 is supplied to a detector unit 24 which performs a hard or soft decision for data symbols based on estimated amplitude scaling factors obtained from an estimation unit 26 which receives statistical information about the sequence of complex data symbols from a statistical analyzing unit 22. The detector unit 24 outputs hard or soft decision results, which are supplied to a decoder unit 28 in order to decode the received complex symbols and obtain the transmitted information.

In the following, the processing and functions at the statistical analyzing unit 22 and scaling factor estimation unit 26 are described in more detail.

Let $\tilde{y}_k$ denote the received noisy complex valued symbol at time instance k, let K be the total number of received symbols taken into account, and $f(x)$ be a function, which will be derived and described in more detail in the next section. $\hat{E}\{\}$, $\hat{V}\{\}$ denote estimates for the expectation value $E\{\}$ and the variance $V\{\}$, respectively, which are calculated at the statistical analyzing unit 22. The operators abs(.),real(.),imag(.) denote the absolute value of the argument and its real or imaginary part, respectively.

Figure 3:
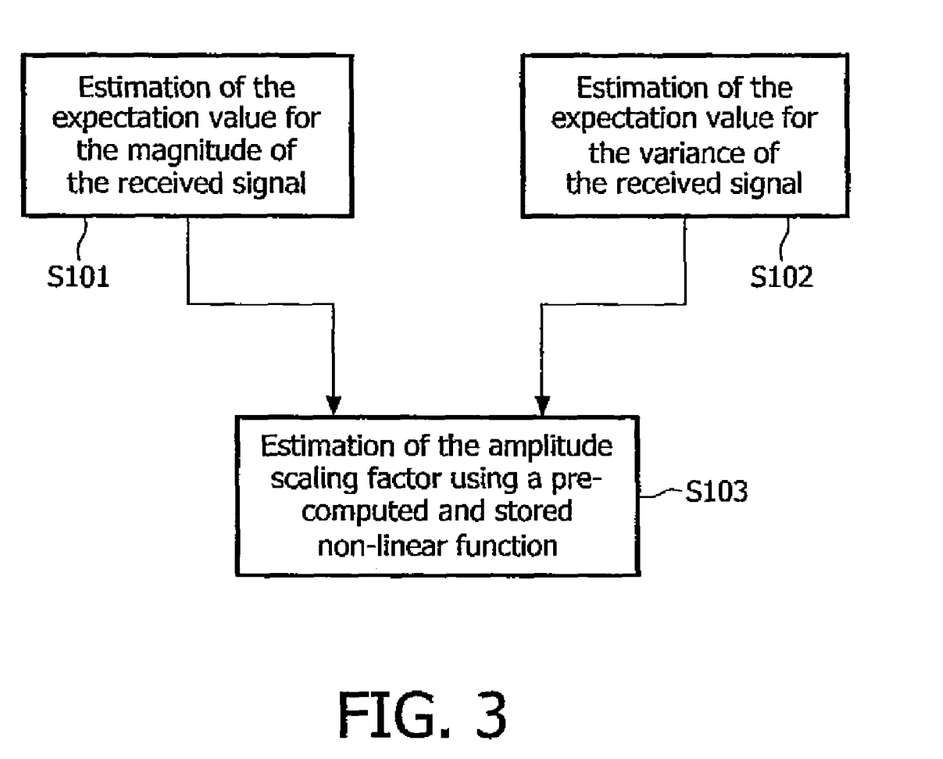
FIG. 3 shows a schematic flow diagram of the blind amplitude estimation method according to one embodiment.

FIG. 3 shows a schematic flow diagram of one embodiment of a procedure for estimating the unknown amplitude scaling factor â. In step S101, an estimate for the expectation value of the magnitude of the received signal is calculated by the statistical analyzing unit 22, e.g., based on the following equation:

$$\hat{E}\{|\tilde{y}|\} = \frac{1}{2K}\sum_{k=0}^{K-1} \text{abs}(\text{real}(\tilde{y}_k)) + \text{abs}(imag(\tilde{y}_k))$$

In a parallel step S102, the statistical analyzing unit 22 calculates an estimate for the variance of the received signal (assuming zero mean), e.g., based on the following equation:

$$\hat{V}\{\tilde{y}\} = \frac{1}{2K}\sum_{k=0}^{K-1} (\text{real}(\tilde{y}_k))^2 + (imag(\tilde{y}_k))^2$$

Of course, step S102 may as well be performed after or before step S101.

Finally, in step S103, the scaling factor estimation unit 26 computes an estimate for the amplitude scaling factor â using a pre-computed function $f(.)$, e.g.:

$$\hat{a} = \frac{\hat{E}\{|\tilde{y}|\}}{f(\hat{V}\{\tilde{y}\}/\hat{E}\{|\tilde{y}|\}^2)}$$

The desired or other particular amplitude scaling factor â can now be applied by the detector unit 24 to the received sequence of symbols, thus normalizing the power of the symbol alphabet to unity.

The relationship expressed by the pre-computed function $f(.)$ may be implemented by storing respective scaling factor values defined by the pre-computed function $f(.)$ in a look-up table (LUT) 25 or other memory devices and addressing the LUT 25 by using the above statistical output values obtained in steps S101 and S102.

Thus, the received complex noisy signal is analyzed at the statistical analyzing unit 22 to determine first order (e.g., expectation value) and second order (e.g., variance) statistics of the real and imaginary part of the signal. These statistics are then used by the scaling factor estimation unit 26 to obtain an amplitude scaling factor from the LUT 25 which has been loaded based on signal model information. In particular, the statistics or any combination thereof is used as input or address for the LUT 25, which provides the desired or other particular amplitude scaling factor.

Without loss of general validity the following specific example of one embodiment relates to 16-QAM modulation. However, the above general procedure can be applied to any other (real or complex valued) symbol alphabet used in combination with linear modulation.

The baseband signal model introduced below is based on the assumption that the transmitted symbols, as supplied to the detector unit 24, are scaled by an unknown factor a and distorted by additive White Gaussian noise (AWGN):

$$\tilde{y}_k^{(c)} = a \cdot (x_k^{(c)} + n_k^{(c)}) \quad (1)$$

with
- a: real valued amplitude scaling factor (to be estimated)
- $x_k^{(c)}$: complex valued transmit symbol at time index k (16-QAM constellation assumed to have unity power)
- $\tilde{y}_k^{(c)}$: complex valued received symbol at time index k
- $n_k^{(c)}$: complex valued noise sample at time k, originating from a complex WGN process with total variance $2\sigma^2$
- k: discrete time index, $k \in \{0,1,\ldots,K-1\}$ It is noted that according to the above definition the noise term $n_k^{(c)}$ is also scaled by a.

For the sake of simplicity, the complex variables are separated at the statistical analyzing unit 22 into their real and imaginary components and it is started with the following simplified model not yet including the factor a:

$$y_k = x_k + n_k \quad (2)$$

with
- $x_k$: real value of transmit symbol at time index k
- $y_k$: real value of received symbol at time index k
- $n_k$: real value of noise sample at time index k, originating from a real valued WGN process with variance $\sigma^2$ The following assumptions are then made:
Real valued noise process with variance $\sigma^2$ is White Gaussian and uncorrelated to signal, i.e.

$$p_n(n) = \frac{1}{\sqrt{2\pi}\,\sigma} e^{-\frac{n^2}{2\sigma^2}}, \quad (3)$$

$$E\{x \cdot n\} = 0 \quad (4)$$

Transmitted symbols are equally distributed (both in real and imaginary part) according to the probability density function (PDF)

$$p_x(x) = \frac{1}{4}\left( \delta_0\!\left(x - \frac{3}{\sqrt{10}}\right) + \delta_0\!\left(x - \frac{1}{\sqrt{10}}\right) + \delta_0\!\left(x + \frac{1}{\sqrt{10}}\right) + \delta_0\!\left(x + \frac{3}{\sqrt{10}}\right)\right) \quad (5)$$

Figure 4:
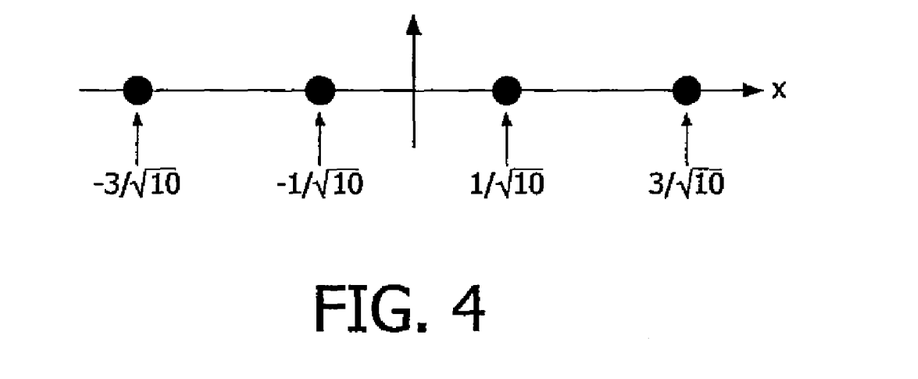
FIG. 4 shows a diagram indicating an amplitude distribution of complex symbols on the real or imaginary axis according to one embodiment.

FIG. 4 shows a diagram indicating the distributions of real and imaginary parts in the concerned 16-QAM modulation scheme, which leads to the above last assumption.

It is further noted that the variance of x is $V\{x\} = \sigma_x^2 = 0.5$, as it denotes only the real or imaginary part of a 16-QAM constellation with average power of 1.

With that, the PDF of y can be expressed as $$p_y(y) = p_x(x) * p_n(n) \quad (6)$$

-continued $$p_y(y) = \frac{1}{4\sqrt{2\pi}\,\sigma}\left( e^{-\frac{(y-\frac{3}{\sqrt{10}})^2}{2\sigma^2}} + e^{-\frac{(y-\frac{1}{\sqrt{10}})^2}{2\sigma^2}} + e^{-\frac{(y+\frac{1}{\sqrt{10}})^2}{2\sigma^2}} + e^{-\frac{(y+\frac{3}{\sqrt{10}})^2}{2\sigma^2}} \right) \quad (7)$$

Now, the magnitude of y is introduced as a derived variable defined as $m = |y|$, for which the PDF can be expressed as follows:

$$p_m(m) = p_{|y|}(|y|) = p_y(y) + p_y(-y) = 2 \cdot p_y(y), \; m \geq 0. \quad (8)$$

The expectation value of m is given by the following expression:

$$E\{m\} = \frac{1}{2\sqrt{2\pi}\,\sigma} \int_0^\infty m \cdot \left( e^{-\frac{(m-\frac{3}{\sqrt{10}})^2}{2\sigma^2}} + e^{-\frac{(m-\frac{1}{\sqrt{10}})^2}{2\sigma^2}} + e^{-\frac{(m+\frac{1}{\sqrt{10}})^2}{2\sigma^2}} + e^{-\frac{(m+\frac{3}{\sqrt{10}})^2}{2\sigma^2}} \right) dm. \quad (9)$$

This can be expressed by:

$$E\{m\} = \frac{1}{2\sqrt{2\pi}}\left[ 2\sigma e^{-\frac{9}{20\sigma^2}} + \frac{3}{5}\sqrt{5\pi} \cdot \mathrm{erf}\!\left(\frac{3\sqrt{5}}{10\sigma}\right) + 2\sigma e^{-\frac{1}{20\sigma^2}} + \frac{1}{5}\sqrt{5\pi} \cdot \mathrm{erf}\!\left(\frac{\sqrt{5}}{10\sigma}\right) \right] \quad (10)$$

Now, the real valued amplitude scaling factor a is taken into account, which leads to the expression:

$$\tilde{y}_k = a(x_k + n_k). \quad (11)$$

Based on that it can be defined $\tilde{m} = |\tilde{y}|$, which results in the expression:

$$E\{\tilde{m}\} = a \cdot E\{m\} = \quad (12)$$

$$= \frac{a}{2\sqrt{2\pi}}\left[ 2\sigma e^{-\frac{9}{20\sigma^2}} + \frac{3}{5}\sqrt{5\pi} \cdot \mathrm{erf}\!\left(\frac{3\sqrt{5}}{10\sigma}\right) + 2\sigma e^{-\frac{1}{20\sigma^2}} + \frac{1}{5}\sqrt{5\pi} \cdot \mathrm{erf}\!\left(\frac{\sqrt{5}}{10\sigma}\right) \right]$$

This can be rewritten as follows:

$$E\{\tilde{m}\} = a \cdot g(\sigma), \quad (13)$$

with $$g(\sigma) = \frac{1}{2\sqrt{2\pi}}\left[ 2\sigma e^{-\frac{9}{20\sigma^2}} + \frac{3}{5}\sqrt{5\pi} \cdot \mathrm{erf}\!\left(\frac{3\sqrt{5}}{10\sigma}\right) + 2\sigma e^{-\frac{1}{20\sigma^2}} + \frac{1}{5}\sqrt{5\pi} \cdot \mathrm{erf}\!\left(\frac{\sqrt{5}}{10\sigma}\right) \right] \quad (14)$$

By rearranging equation (13), the following expression for a can be obtained:

$$a = \frac{E\{\tilde{m}\}}{g(\sigma)} = \frac{E\{|\tilde{y}|\}}{g(\sigma)}. \quad (15)$$

While an estimate for $E\{|\tilde{y}|\}$ can be computed at the statistical analyzing unit 22 from the received samples, the noise standard deviation $\sigma$ is unknown at this point.

The approach proposed here is based on an implicit estimation of the standard deviation $\sigma$.

First, the variance of $\tilde{y}$ can be expressed as follows:

$$V\{\tilde{y}\} = \sigma_{\tilde{y}}^2 = a^2(\sigma_x^2 + \sigma^2) = a^2(0.5 + \sigma^2). \quad (16)$$

In order to get rid of the unknown variable a, the variance of $\tilde{y}$ is divided by $E\{|\tilde{y}|\}^2$, i.e., the relative ratio $R(\sigma)$ is defined as:

$$R(\sigma) = \frac{V\{\tilde{y}\}}{E\{|\tilde{y}|\}^2} = \\ = \frac{8\pi \cdot (0.5 + \sigma^2)}{\left[ 2\sigma e^{-\frac{9}{20\sigma^2}} + \frac{3}{5}\sqrt{5\pi} \cdot \mathrm{erf}\left(\frac{3\sqrt{5}}{10\sigma}\right) + 2\sigma e^{-\frac{1}{20\sigma^2}} + \frac{1}{5}\sqrt{5\pi} \cdot \mathrm{erf}\left(\frac{\sqrt{5}}{10\sigma}\right) \right]^2}, \quad (17)$$

which is independent of the amplitude scaling a.

By inserting $\sigma$ in (14) and (17), both the corresponding ratio $R(\sigma)$ and the term $g(\sigma)$ can be computed. As a result, the unknown noise standard deviation $\sigma$ is eliminated and g can be plotted over $$R(\sigma) = \frac{V\{\tilde{y}\}}{E\{|\tilde{y}|\}^2}, \text{ i.e, } g = f(V\{\tilde{y}\}/E\{|\tilde{y}|\}^2).$$

The required argument $V\{\tilde{y}\}/E\{|\tilde{y}|\}^2$ can be estimated at the statistical analyzing unit 22 from the received signal. It can be used by the scaling factor estimation unit 26 as an address to the lookup table 25 implementing the function $f(.)$, thus providing g.

Figure 5:
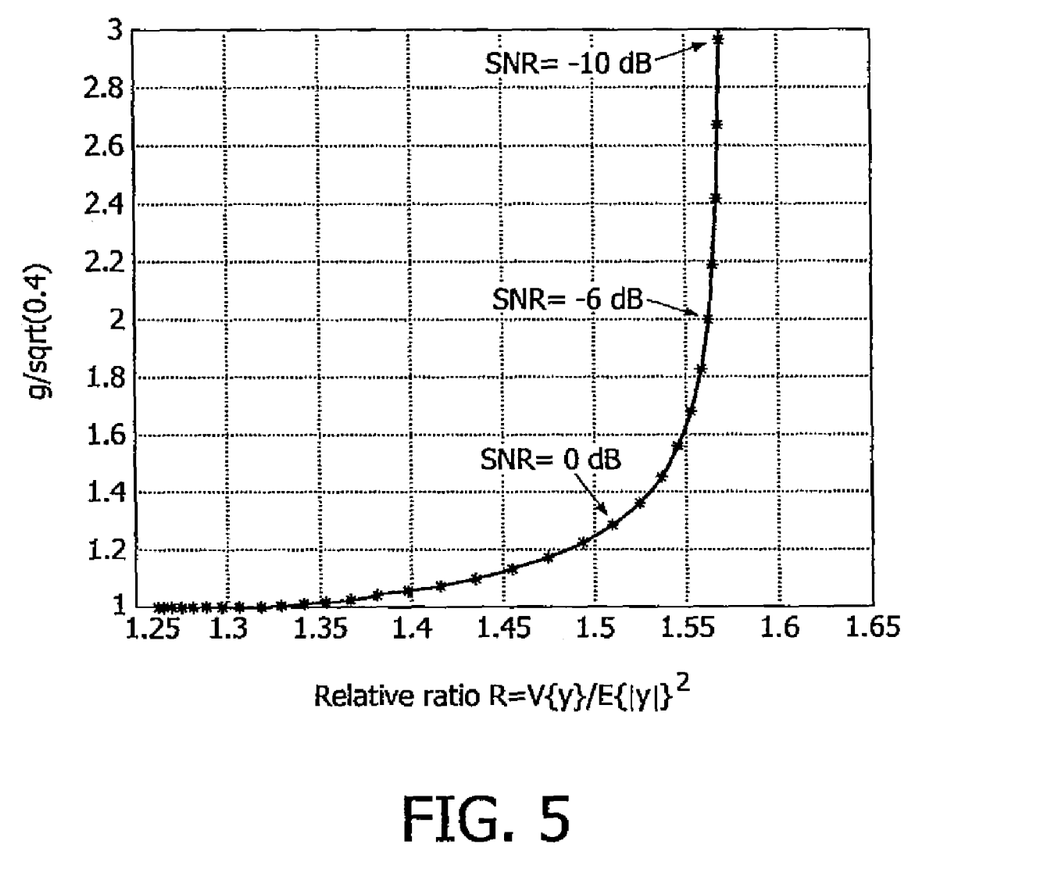
FIG. 5 shows a diagram with a normalized non-linear function for obtaining amplitude scaling factors according to one embodiment.

FIG. 5 shows a diagram indicating the function g normalized to $g(\sigma=0)=\sqrt{0.4}$. The distance between two markers of the curve corresponds to a SNR difference of 1 dB. This normalized function can be interpreted as an amplitude scaling or correction factor, where the argument of the function g is an indirect measure for the noise variance of the unscaled signal.

The smallest value of the ratio $V\{\tilde{y}\}/E\{|\tilde{y}|\}^2$ can take in the absence of noise ($\sigma=0$) is 1.25. As in a real system only the related estimates $\hat{E}\{|\tilde{y}|\}, \hat{V}\{\tilde{y}\}$ are available, values <1.25 can occur and should be mapped to $g=\sqrt{0.4}$.

The values stored in the LUT 25 are computed once, to be available for all times, since they do not change for a specific modulation scheme.

In summary, embodiments of a receiver apparatus and method of blind amplitude estimation for a received complex signal have been described, wherein the complex signal is analyzed to determine first and second order statistics of real part and imaginary part of the complex signal. Based on a predetermined or other particular non-linear function, amplitude scaling information is pre-calculated and used to derive a desired or other particular amplitude scaling information for said determined first and second order statistics. Thereby, a low complexity method for blind amplitude estimation for unknown data symbols distorted by an unknown amount of noise can be provided.

It is noted that the embodiment(s) can be applied to any receiver of any communication system employing an M-ary linear modulation, where the amplitude of the transmitted symbols carries information. Due to the simple and easy processing as described herein, one embodiment is particularly advantageous for high-speed downlink packet access (HSDPA) as standardized within 3GPP UMTS frequency division duplex (FDD) framework.

The present embodiment(s) is not restricted to the above calculation of variance and expectation values, and any kind of first order statistics and second order statistics—or even higher order statistics—could be used to obtain derivable statistical values which can be mapped via a suitable function to scaling factor estimations or amplitude estimations. The embodiments may thus vary within the scope of the attached claims.

Finally but yet importantly, it is noted that the term "comprises" or "comprising" when used in the specification including the claims is intended to specify the presence of stated features, means, steps, acts, or components, but does not exclude the presence or addition of one or more other features, means, steps, acts, components, or group thereof. Further, the word "a" or "an" preceding an element in a claim does not exclude the presence of a plurality of such elements. Moreover, any reference sign does not limit the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

For instance in one embodiment, the various operations described above for example with respect to FIGS. 1 and 3, can be embodied in software or other computer-readable instructions stored on a computer-readable medium and executable by a processor. In such an embodiment, such computer-readable instructions can be stored in the memory device 25 (and/or other hardware storage medium), to which the processor is coupled. The processor can be implemented according to various embodiments as the estimation unit 26, the statistical analyzing unit 22, and/or other device adapted to execute the computer-readable instructions in order to perform the operations described herein.

In other embodiments, hardware or a combination of hardware and software can be used to provide the features and/or operations described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A receiver apparatus for receiving a complex signal via a digital transmission channel, said receiver apparatus comprising:
analyzing means for analyzing said complex signal to determine first and second order statistics of real part and imaginary part of said complex signal;

a scaling factor estimating unit to pre-compute amplitude scaling information using a pre-computed function;

memory means for storing said pre-computed scaling information;

determination means for addressing said memory means based on said first and second order statistics in order to derive a particular amplitude scaling information; and detecting means for detecting information provided in said complex signal by using said derived particular amplitude scaling information wherein the pre-computed function is a function of the second order statistic divided by a square of the first order statistic.

2. The apparatus according to claim 1 wherein said memory means includes a look-up table.

3. The apparatus according to claim 1 wherein said first and second order statistics relate to an expectation value of a magnitude, and to a variance of, said complex signal.

4. The apparatus according to claim 1 wherein said first and second order statistics are obtained by taking a particular number of received symbols of said complex signal into account.

5. The apparatus according to claim 1 wherein said determination means is adapted to address said memory means based on a ratio between said first and second order statistics.

6. A method of blind amplitude estimation for a received complex signal, said method comprising:

analyzing, by an analyzing means, said complex signal to determine first and second order statistics of real part and imaginary part of said complex signal;

pre-calculating, by a scaling factor estimating unit, amplitude scaling information based on a non-linear function; and using, by the scaling factor estimating unit, said pre-calculated amplitude scaling information to derive a particular amplitude scaling information for said determined first and second order statistics wherein the pre-calculation comprises dividing the second order statistic by a square of the first order statistic.

7. The method according to claim 6 wherein said non-linear function is derived from probability density functions of noise and symbols provided in said complex signal.

8. The method according to claim 6 wherein said received complex signal is modulated by an M-ary linear modulation.

9. A method of blind amplitude estimation for a complex signal received via a digital transmission channel, said method comprising:

analyzing, by an analyzing means, said complex signal to determine first and second order statistics of real part and imaginary part of said complex signal;

pre-computing, by a scalar factor estimating unit, amplitude scaling information based on a non-linear function;

storing, by a storing means, said pre-computed amplitude scaling information;

addressing, by a determination means, said memory means based on said first and second order statistics in order to derive a particular amplitude scaling information; and detecting, by a detecting means, information provided in said complex signal by using said derived particular amplitude scaling information wherein the pre-computation comprises dividing the second order statistic by a square of the first order statistic.

10. The method of claim 9 wherein storing said amplitude scaling information includes storing said amplitude scaling information in a look-up table.

11. The method of claim 9 wherein said addressing said memory means includes addressing said memory means based on a ratio between said first and second order statistics.

12. The method of claim 9 wherein said received complex signal is modulated by an M-ary linear modulation.

13. The method of claim 9 wherein said first and second order statistics relate to an expectation value of a magnitude, and to a variance of, said complex signal.

14. A receiver apparatus to receive a complex signal via a digital transmission channel, said receiver apparatus comprising:

an analyzer unit adapted to analyze said complex signal to determine first and second order statistics of real part and imaginary part of said complex signal;

an estimation unit coupled to said analyzer unit and adapted to use said first and second order statistics in order to derive particular amplitude scaling information by dividing the second order statistic by a square of the first order statistic; and a detector unit coupled to said estimation unit and adapted to detect information provided in said complex signal by use of said particular amplitude scaling information derived by said estimation unit.

15. The apparatus of claim 14, further comprising a memory unit coupled to said estimation unit and adapted to store amplitude scaling information, said estimation unit being adapted to said use said first and second order statistics to address said memory unit in order to said derive said particular amplitude information from the stored amplitude scaling information.

16. The apparatus of claim 15 wherein said memory unit includes a look-up table.

17. The apparatus of claim 15 wherein said estimation unit is adapted to address said memory unit based on a ratio between said first and second order statistics.

18. The apparatus of claim 14, further comprising a decoder coupled to said detector unit and adapted to decode said received complex signal and obtain information transmitted therein.

19. A mobile telephone apparatus, comprising: an antenna to receive a signal; a radio frequency unit coupled to said antenna to obtain a sequence of complex symbols from said received signal; an analyzer unit coupled to said radio frequency unit and adapted to analyze said obtained complex symbols to determine first and second order statistics of real part and imaginary part, said analyzer unit further being adapted to pre-calculate amplitude scaling information based on a non-linear function; and an estimation unit coupled to said analyzer unit and adapted to use said pre-calculated amplitude scaling information to derive particular amplitude scaling information for said determined first and second order statistics wherein the pre-calculation comprises dividing the second order statistic by a square of the first order statistic.

20. The mobile telephone apparatus of claim 19, further comprising: a detector unit coupled to said estimation unit and adapted to detect information represented by said complex symbols by use of said particular amplitude scaling information derived by said estimation unit; and a decoder coupled to said detector unit and adapted to decode said received complex symbols and obtain said information.

21. The mobile telephone apparatus of claim 19 wherein said received signal is modulated by an M-ary linear modulation.

22. The mobile telephone apparatus of claim 19 wherein said non-linear function is derived from probability density functions of noise and said symbols.

* * * * *

UNITED STATES PATENT AND TRADEMARK OFFICE
CERTIFICATE OF CORRECTION

| | |
|---|---|
| PATENT NO. | : 8,290,090 B2 |
| APPLICATION NO. | : 12/346515 |
| DATED | : October 16, 2012 |
| INVENTOR(S) | : Alexander Lampe and Stefan Mueller-Weinfurtner |

It is certified that error appears in the above-identified patent and that said Letters Patent is hereby corrected as shown below:

In the Abstract, line 1, after "provided", insert --to determine--;

In column 4, line 6, please change "$\tilde{y}_k$" to --$\tilde{y}_k$--;
In column 4, line 7, please change "k" to --$k$--;
In column 4, line 7, please change "K" to --$K$--;
In column 4, line 8, please change "f(x)" to --$f(x)$--;
In column 4, line 9, please change "Ê{ }" to --$\hat{E}\{\ \}$--;
In column 4, line 10, please change "$\hat{V}\{\ \}$" to --$\hat{V}\{\ \}$--;
In column 4, line 10, please change "E{ }" to --$E\{\ \}$--;
In column 4, line 11, please change "V{ }" to --$V\{\ \}$--;
In column 4, line 12, please change "abs" to --$abs$--;
In column 4, line 12, please change "real" to --$real$--;
In column 4, line 12, please change "imag" to --$imag$--;
In column 4, line 17, please change "â" to --$\hat{a}$--;
In column 4, line 24, please change each of the two occurrences of "abs" to --$abs$--;
In column 4, line 24, please change "real" to --$real$--;
In column 4, line 33, please change "real" to --$real$--;
In column 4, line 40, please change "â" to --$\hat{a}$--;
In column 4, line 41, please change "f(.)" to --$f(.)$--;
In column 4, line 48, please change "â" to --$\hat{a}$--;

Page 1 of 3

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 8,290,090 B2

In column 4, line 53, please change "f(.)" to --$f(.)$--;
In column 4, line 54, please change "f(.)" to --$f(.)$--;

In column 5, line 8, please change "a" to --$a$--;
In column 5, line 14, please change "a" to --$a$--;
In column 5, line 15, please change "$x_k^{(c)}$" to -- $x_k^{(c)}$ --;
In column 5, line 17, please change "$\tilde{y}_k^{(c)}$" to -- $\tilde{y}_k^{(c)}$ --;
In column 5, line 18, please change "$n_k^{(c)}$" to --$n_k^{(c)}$--;
In column 5, line 19, please change "$2\sigma^2$" to --$2\sigma^2$--;
In column 5, line 20, please change each of the two occurrences of "k" to --$k$--;
In column 5, line 20, please change "K" to --$K$--;
In column 5, line 22, please change "$n_k^{(c)}$" to --$n_k^{(c)}$--;
In column 5, line 22, please change "a" to --$a$--;
In column 5, line 26, please change "a" to --$a$--;
In column 5, line 31, please change "$x_k$" to --$x_k$--;
In column 5, line 32, please change "$y_k$" to --$y_k$--;
In column 5, line 33, please change "$n_k$" to --$n_k$--;
In column 5, line 34, please change "$\sigma$" to -- $\sigma$ --;
In column 5, line 36, please change "$\sigma$" to -- $\sigma$ --;
In column 5, line 59, please change "x" to --$x$--;
In column 5, line 59, please change "V{x}" to --$V\{x\}$--;
In column 5, line 59, please change "$\sigma_x^2$" to -- $\sigma_x^2$ --;
In column 5, line 62, please change "y" to --$y$--;

In column 6, line 10, please change "y" to --$y$--;
In column 6, line 11, please change "m = |y|" to --$m = |y|$--;
In column 6, line 11, please change "|y|" to --$|y|$--;
In column 6, line 15, please change "m" to --$m$--;
In column 6, line 37, please change "a" to --$a$--;
In column 6, line 42, please change "$\tilde{m} = |\tilde{y}|$" to --$\tilde{m} = |\tilde{y}|$--
In column 6, line 67, please change "a" to --$a$--;

In column 7, line 6, please change "$E\{|\tilde{y}|\}$" to --$E\{|\tilde{y}|\}$--;
In column 7, line 8, please change "$\sigma$" to -- $\sigma$ --;
In column 7, line 10, please change "$\sigma$" to -- $\sigma$ --;
In column 7, line 11, please change "$\tilde{y}$" to -- $\tilde{y}$ --;
In column 7, line 13, please change "a" to --$a$--;
In column 7, line 14, please change the first occurrence of "$\tilde{y}$" to -- $\tilde{y}$ --;
In column 7, line 14, please change "$E\{|\tilde{y}|\}^2$" to --$E\{|\tilde{y}|\}^2$--;
In column 7, line 14, please change "R($\sigma$)" to -- $R(\sigma)$ --;
In column 7, line 31, please change "a" to --$a$--;
In column 7, line 32, please change "$\sigma$" to -- $\sigma$ --;
In column 7, line 33, please change "R($\sigma$)" to -- $R(\sigma)$ --;
In column 7, line 33, please change "g($\sigma$)" to -- $g(\sigma)$ --;
In column 7, line 34, please change "$\sigma$" to -- $\sigma$ --;
In column 7, line 34, please change "g" to --$g$--;

CERTIFICATE OF CORRECTION (continued)

U.S. Pat. No. 8,290,090 B2

In column 7, line 41, please change "$V\{\tilde{y}\}/E\{|\tilde{y}|\}^2$" to --$V\{\tilde{y}\}/E\{|\tilde{y}|\}^2$--;
In column 7, line 44, please change "f(.)" to --$f(.)$--;
In column 7, line 45, please change "g" to --$g$--;
In column 7, line 47, please change "g($\sigma$ = 0)" to --$g(\sigma=0)$--;
In column 7, line 53, please change "$V\{\tilde{y}\}/E\{|\tilde{y}|\}^2$" to --$V\{\tilde{y}\}/E\{|\tilde{y}|\}^2$--;
In column 7, line 54, please change "($\sigma$ = 0)" to --$(\sigma=0)$--;
In column 7, line 55, please change "$\hat{E}\{|\tilde{y}|\}, \hat{V}\{\tilde{y}\}$" to --$\hat{E}\{|\tilde{y}|\}, \hat{V}\{\tilde{y}\}$--;
In column 7, line 56, please change "g" to --$g$--;

In claim 15, line 4, please change "said use" to --use--;
In claim 15, line 5, please change "said derive" to --derive--.

UNITED STATES PATENT AND TRADEMARK OFFICE
CERTIFICATE OF CORRECTION

PATENT NO.        : 8,290,090 B2
APPLICATION NO.   : 12/346515
DATED             : October 16, 2012
INVENTOR(S)       : Alexander Lampe and Stefan Mueller-Weinfurtner It is certified that error appears in the above-identified patent and that said Letters Patent is hereby corrected as shown below:

Title Page, Item (57) Abstract, line 1, after "provided", insert --to determine--;

In the Specifications:

In column 4, line 6, please change "$\tilde{y}_k$" to --$\tilde{y}_k$--;
In column 4, line 7, please change "k" to --$k$--;
In column 4, line 7, please change "K" to --$K$--;
In column 4, line 8, please change "f(x)" to --$f(x)$--;
In column 4, line 9, please change "$\hat{E}\{\ \}$" to --$\hat{E}\{\ \}$--;
In column 4, line 10, please change "$\hat{V}\{\ \}$" to --$\hat{V}\{\ \}$--;
In column 4, line 10, please change "E{ }" to --$E\{\ \}$--;
In column 4, line 11, please change "V{ }" to --$V\{\ \}$--;
In column 4, line 12, please change "abs" to --$abs$--;
In column 4, line 12, please change "real" to --$real$--;
In column 4, line 12, please change "imag" to --$imag$--;
In column 4, line 17, please change "â" to --$\hat{a}$--;
In column 4, line 24, please change each of the two occurrences of "abs" to --$abs$--;
In column 4, line 24, please change "real" to --$real$--;
In column 4, line 33, please change "real" to --$real$--;
In column 4, line 40, please change "â" to --$\hat{a}$--;
In column 4, line 41, please change "f(.)" to --$f(.)$--;
In column 4, line 48, please change "â" to --$\hat{a}$--;

This certificate supersedes the Certificate of Correction issued April 16, 2013.

Signed and Sealed this
Twenty-eighth Day of May, 2013

Teresa Stanek Rea
*Acting Director of the United States Patent and Trademark Office*

CERTIFICATE OF CORRECTION (continued)
U.S. Pat. No. 8,290,090 B2

In column 4, line 53, please change "f(.)" to --$f(.)$--;
In column 4, line 54, please change "f(.)" to --$f(.)$--;

In column 5, line 8, please change "a" to --$a$--;
In column 5, line 14, please change "a" to --$a$--;
In column 5, line 15, please change "$x_k^{(c)}$" to --$x_k^{(c)}$--;
In column 5, line 17, please change "$\tilde{y}_k^{(c)}$" to --$\tilde{y}_k^{(c)}$--;
In column 5, line 18, please change "$n_k^{(c)}$" to --$n_k^{(c)}$--;
In column 5, line 19, please change "$2\sigma^2$" to --$2\sigma^2$--;
In column 5, line 20, please change each of the two occurrences of "k" to --$k$--;
In column 5, line 20, please change "K" to --$K$--;
In column 5, line 22, please change "$n_k^{(c)}$" to --$n_k^{(c)}$--;
In column 5, line 22, please change "a" to --$a$--;
In column 5, line 26, please change "a" to --$a$--;
In column 5, line 31, please change "$x_k$" to --$x_k$--;
In column 5, line 32, please change "$y_k$" to --$y_k$--;
In column 5, line 33, please change "$n_k$" to --$n_k$--;
In column 5, line 34, please change "$\sigma$" to --$\sigma$--;
In column 5, line 36, please change "$\sigma$" to --$\sigma$--;
In column 5, line 59, please change "x" to --$x$--;
In column 5, line 59, please change "V{x}" to --$V\{x\}$--;
In column 5, line 59, please change "$\sigma_x^2$" to --$\sigma_x^2$--;
In column 5, line 62, please change "y" to --$y$--;

In column 6, line 10, please change "y" to --$y$--;
In column 6, line 11, please change "m = |y|" to --$m = |y|$--;
In column 6, line 11, please change "|y|" to --$|y|$--;
In column 6, line 15, please change "m" to --$m$--;
In column 6, line 37, please change "a" to --$a$--;
In column 6, line 42, please change "$\tilde{m} = |\tilde{y}|$" to --$\tilde{m} = |\tilde{y}|$--
In column 6, line 67, please change "a" to --$a$--;

In column 7, line 6, please change "E{|$\tilde{y}$|}" to --$E\{|\tilde{y}|\}$--;
In column 7, line 8, please change "$\sigma$" to --$\sigma$--;
In column 7, line 10, please change "$\sigma$" to --$\sigma$--;
In column 7, line 11, please change "$\tilde{y}$" to --$\tilde{y}$--;
In column 7, line 13, please change "a" to --$a$--;
In column 7, line 14, please change the first occurrence of "$\tilde{y}$" to --$\tilde{y}$--;
In column 7, line 14, please change "E{|$\tilde{y}$|}$^2$" to --$E\{|\tilde{y}|\}^2$--;
In column 7, line 14, please change "R($\sigma$)" to --$R(\sigma)$--;
In column 7, line 31, please change "a" to --$a$--;
In column 7, line 32, please change "$\sigma$" to --$\sigma$--;
In column 7, line 33, please change "R($\sigma$)" to --$R(\sigma)$--;
In column 7, line 33, please change "g($\sigma$)" to --$g(\sigma)$--;
In column 7, line 34, please change "$\sigma$" to --$\sigma$--;
In column 7, line 34, please change "g" to --$g$--;

CERTIFICATE OF CORRECTION (continued)
U.S. Pat. No. 8,290,090 B2

In column 7, line 41, please change "$V\{\tilde{y}\}/E\{|\tilde{y}|\}^2$" to --$V\{\tilde{y}\}/E\{|\tilde{y}|\}^2$--;
In column 7, line 44, please change "f(.)" to --$f(.)$--;
In column 7, line 45, please change "g" to --$g$--;
In column 7, line 47, please change "g(σ = 0)" to --$g(\sigma = 0)$--;
In column 7, line 53, please change "$V\{\tilde{y}\}/E\{|\tilde{y}|\}^2$" to --$V\{\tilde{y}\}/E\{|\tilde{y}|\}^2$--;
In column 7, line 54, please change "(σ = 0)" to --($\sigma = 0$)--;
In column 7, line 55, please change "$\hat{E}\{|\tilde{y}|\}, \hat{V}\{\tilde{y}\}$" to --$\hat{E}\{|\tilde{y}|\}, \hat{V}\{\tilde{y}\}$--;
In column 7, line 56, please change "g" to --$g$--;

In the Claims:
Column 10, line 24 (claim 15, line 4) please change "said use" to --use--;
Column 10, line 25 (claim 15, line 5) please change "said derive" to --derive--.